United States Patent
Kim

(10) Patent No.: US 12,514,836 B2
(45) Date of Patent: Jan. 6, 2026

(54) COMPOSITION FOR PREVENTION AND TREATMENT OF MYOPATHY

(71) Applicant: ONCOCROSS CO., LTD., Seoul (KR)

(72) Inventor: Yi-Rang Kim, Sejong-si (KR)

(73) Assignee: ONCOCROSS CO., LTD., Seoul (KR)

( * ) Notice: Subject to any disclaimer, the term of this patent is extended or adjusted under 35 U.S.C. 154(b) by 534 days.

(21) Appl. No.: 18/020,774

(22) PCT Filed: Aug. 10, 2021

(86) PCT No.: PCT/KR2021/010535
§ 371 (c)(1),
(2) Date: Feb. 10, 2023

(87) PCT Pub. No.: WO2022/035169
PCT Pub. Date: Feb. 17, 2022

(65) Prior Publication Data
US 2023/0301953 A1    Sep. 28, 2023

(30) Foreign Application Priority Data

Aug. 10, 2020 (KR) .......................... 10-2020-0099815

(51) Int. Cl.
*A61K 31/197* (2006.01)
*A61K 9/00* (2006.01)
*A61K 31/138* (2006.01)
*A61P 21/00* (2006.01)

(52) U.S. Cl.
CPC .......... *A61K 31/197* (2013.01); *A61K 9/0056* (2013.01); *A61K 31/138* (2013.01); *A61P 21/00* (2018.01)

(58) Field of Classification Search
CPC .................................................. A61K 31/197
See application file for complete search history.

(56) References Cited

U.S. PATENT DOCUMENTS 9,572,810 B2   2/2017   Lange et al.

FOREIGN PATENT DOCUMENTS

| KR | 10-2019-0124143 A | 11/2019 |
| WO | 2017/203540 A1 | 11/2017 |
| WO | 2017/218905 A1 | 12/2017 |

OTHER PUBLICATIONS

Min et al. Korean Society for Clinical Neurophysiology, 2005, 7(2): 101-106.*
Ju-Hong Min, M.D. et al., "Neuroprotective Effects of Multi-vitamin Therapy in Transgenic Mouse Model of Amyotrophic Lateral Sclerosis", Korean Society for Clinical Neurophysiology, Nov. 2005, pp. 101-106, vol. 7, No. 2.
International Search Report for PCT/KR2021/010535 dated, Nov. 18, 2021 (PCT/ISA/210).

* cited by examiner

*Primary Examiner* — Rei Tsang Shiao
(74) *Attorney, Agent, or Firm* — Sughrue Mion, PLLC

(57) ABSTRACT

The present invention relates to a pharmaceutical composition comprising calcium pantothenate, or calcium pantothenate and dimenhydrinate as active ingredients for prevention and treatment of myopathy. According to the present disclosure, calcium pantothenate upregulates the expression of MHC, myogenin 4-EBP, and p70S6K to promote myoblast differentiation and myogenesis, thereby prolonging the duration of life in amyotrophic lateral sclerosis patients and promoting the growth of MSC in Duchenne muscular dystrophy mice. Such effects are synergistically increased upon combined treatment with dimenhydrinate. Thus, they can be advantageously used for preventing or treating myopathy.

11 Claims, 5 Drawing Sheets

Myogenesis through the AKT/mTOR pathway

COMPOSITION FOR PREVENTION AND TREATMENT OF MYOPATHY

CROSS REFERENCE TO RELATED APPLICATIONS

This application is a National Stage of International Application No. PCT/KR2021/010535 filed Aug. 10, 2021, claiming priority based on Korean Patent Application No. 10-2020-0099815 filed Aug. 10, 2020, the entire disclosures of which are incorporated herein by reference.

TECHNICAL FIELD

The present invention relates to a pharmaceutical composition for prevention and treatment of myopathy, and more particularly, to a pharmaceutical composition for prevention and treatment of myopathy including calcium pantothenate, or calcium pantothenate and dimenhydrinate as active ingredients.

BACKGROUND ART

Muscular dystrophy is a genetic muscular disorder group that causes a deficient muscle fiber function due to regeneration of occluded muscles as well as weakening and destruction of muscle fibers through inflammation. Duchenne muscular dystrophy (DMD) is severe myopathy associated with an occluded dystrophin gene and causes myofascial defects associated with increased pro-inflammatory cytokines, mitochondrial dysfunction, and impaired satellite cell (muscle stem cell) polarity.

Meanwhile, amyotrophic lateral sclerosis (ALS) was first described by Bell in 1830 and named as ALS by Charcot in 1874. As the disease name implies, the ALS is a degenerative nervous system lesion clinically characterized by muscular atrophy, muscular weakness, fasciculation, and the like. The ALS is also called "motor neuron disease" because motor neurons of the external and spinal cord are selectively destroyed, and also called "Lou Gehrig's disease" or "Lou Gehrig disease", originating from the name of an athlete who suffered from the disease in the 1930s. The ALS is accompanied by degeneracy of both upper motor neurons (UMN) and lower motor neurons (LMN) and presents with symptoms of neural atrophy, emaciation, and fasciculation. Pathophysiologically, in the ALS, motor neurons of the central nervous system are destroyed, so that muscles do not exhibit a proper motor function in response to motor neuron stimulation. On the other hand, since sensory nerves, autonomic nerves, and the like distributed throughout the body are rarely invaded, sensory abnormalities or autonomic disorders are rarely exhibited clinically. As a pathogenesis of amyotrophic lateral sclerosis, about 10% shows constant heritability in the family, but most thereof is not yet clearly identified as in various sporadic degenerative nervous system lesions. The pathogenesis known to date is as follows. First, there may be excitatory toxic substances. The central nervous system, such as the cerebrum, the brainstem, and the spinal cord, consists of neurons that transmit signals and neuroglia required for maintaining the biological functions of neurons, and a role of a specific neurotransmitter is important between these neurons and neurons or between the neurons and the neuroglia. According to several studies so far, in the ALS, among many neurotransmitters, particularly, glutamate as an excitatory neurotransmitter, is present at a high concentration at the junction between motor neurons, and it is described that the substance will secondarily show a toxic effect on neurons to destroy the motor neurons. At this time, the concentration of glutamate is abnormally increased by a certain mechanism, and through a certain biological process, these glutamates cause excessive excitatory neurotoxicity in the motor neurons (Rothstein. Clin. Neurosci. 3:348-359 (1995); Ikonomidou, Qin, Labruyere, and Olney J. Neuropathol. Exp. Neurol. 55:211-224 (1996)). Second, there may be an autoimmune pathogenesis. In general, the immune system protects the body from internal and external invasions through cellular or humoral immune mechanisms. However, in special cases, autoantibodies are formed against antigens present in our body. In other words, as in other autoimmune diseases of the body, there is a theory that even in ALS, autoantibodies are formed against antigens present in the body, and secondarily, the motor neurons will be damaged. In ALS patients, antibodies (Anti-VGCC) are formed against a "potential-dependent calcium channel" located in a motor neuron membrane, and subsequently, a series of biological processes occur according to the antigen-antibody reaction, and eventually, motor neurons may be destroyed. Appel et al. detected anti-VGCC antibodies in about 80% of sporadic ALS patients and argued that the higher the antibody titer, the faster the disease progressed. However, it has been evaluated that there are still many areas to be identified even in the autoimmune pathogenesis. Third, there may be free radicals as the cause. Since Rosen et al. reported the gene mutation of a superoxide dismutase (SOD) enzyme in familial ALS patients in 1933, researches in this field have been very actively conducted. So far, it has been possible to reproduce experimental animals similar to a human ALS disease by performing the treatment on SOD transgenic mice. Recently, in the ALS Research Institute of Seoul National University Hospital, researches have been actively conducted to identify a role of free radicals in the pathogenesis of ALS through a series of experiments, such as infecting a motor neuron cell line with a mutant gene. Fourth, there may be a deficiency of neurotrophic factors. Like other cells in the body, motor neurons also require the role of appropriate neurotrophic factors in order to maintain smooth functions. In some cases, the supply of these neurotrophic factors may be blocked or their use may be limited, and thus the motor neurons may be destroyed. Representative neurotrophic factors important for the development, regeneration, and healing of the motor neurons include IGF-1, CNTF, BDNF, and the like, and in particular, the IGF-1 is known to have a very important function in a sprouting process of neurons. Finally, there may be abnormalities in the skeleton of the motor neurons. Aggregates or neurofilaments, which are not normally observed, are observed in the microstructure of spinal motor neurons of patients with ALS. However, it is not clear whether the aggregates or neurofilaments actually act as a causative factor in ALS or are products of the progression of ALS lesions. As a result, it is required to solve questions of what causes amyotrophic lateral sclerosis, what process gradually leads to a vicious cycle, and why motor neurons are selectively destroyed among many cells. It has been thought that the ALS is caused by a "multiple pathogenesis" in which an individual in a biologically vulnerable state is exposed to a specific external environment and exposed to various causative factors mentioned above to damage the motor neurons. Familial amyotrophic lateral sclerosis (ALS), which shows constant heritability in the family, refers to the onset of ALS transmitted genetically, and accounts for about 10% of overall amyotrophic lateral sclerosis. According to a recent announcement, it has been found that the ALS is a complex genetic disease inherited according to Mendel's law, and 10% of ALS patients are caused by genetic (familial) causes, and 20% thereof are associated with a Cu—Zn superoxide dismutase 1 (SOD1) gene. In particular, superoxide dismutase (SOD) plays a role in protecting cells from toxicity by converting superoxide ions into oxygen and hydrogen peroxide because free radical anions of superoxide ions have a harmful effect on cells. Antioxidant defense mechanisms by the SOD are important in almost all cells exposed to oxygen, and it is known that some lactic acid bacteria use other defense mechanisms. SOD1 is an antioxidant enzyme and found in the cytoplasm, mitochondria, and nucleus, and consists of 153 amino acids and acts as a 32 kDa homodimer. To date, 105 or more mutations in SOD1 causing ALS are known. It has been reported that the mutant antioxidant enzyme SOD1 causes the death of motor neurons through gain of function rather than loss of function. Due to the gain of function of SOD1, it has been estimated that mutant SOD1 causes motor neuron death through a combination of several mechanisms, such as mitochondrial functional defects, protein misfolding, weakening of the ubiquitin proteasome system, degradation of other proteins, and inappropriate growth factor signaling. Currently, many studies on ALS therapeutic agents are being conducted, but there is no fundamental treatment for ALS itself. In general, symptomatic therapy is recommended for patients with ALS to alleviate the symptoms complained of by the patients. Currently, drugs to be clinically prescribed include 'Riluzole', as an ALS therapeutic agent that has begun to be recognized as having the effect of prolonging the life overseas as a drug that delays the progression of ALS disease. The 'Riluzole' is a drug that suppresses excessive glutamic acid, which is considered one of the causes of destroying motor neurons.

DISCLOSURE

Technical Problem

An object of the present invention is to provide a pharmaceutical composition for prevention or treatment of myopathy.

Another object of the present invention is to provide a food composition for prevention or improvement of myopathy.

Technical Solution

An aspect of the present invention provides a pharmaceutical composition for prevention or treatment of myopathy, including pantothenic acid or a pharmaceutically acceptable salt thereof as an active ingredient.

Another aspect of the present invention provides a food composition for prevention or improvement of myopathy, including pantothenic acid or a pharmaceutically acceptable salt thereof as an active ingredient.

Advantageous Effects

According to the present invention, calcium pantothenate increases the expression of MHC, myogenin 4-EBP, and p70S6K to promote myoblast differentiation and myogenesis, thereby prolonging the duration of life in amyotrophic lateral sclerosis patients and promoting the growth of MSC in Duchenne muscular dystrophy mice. Such effects are synergistically increased upon combined treatment with dimenhydrinate. Thus, the calcium pantothenate and dimenhydrinate can be advantageously used for preventing or treating myopathy.

BEST MODE OF THE INVENTION

Figure 1:
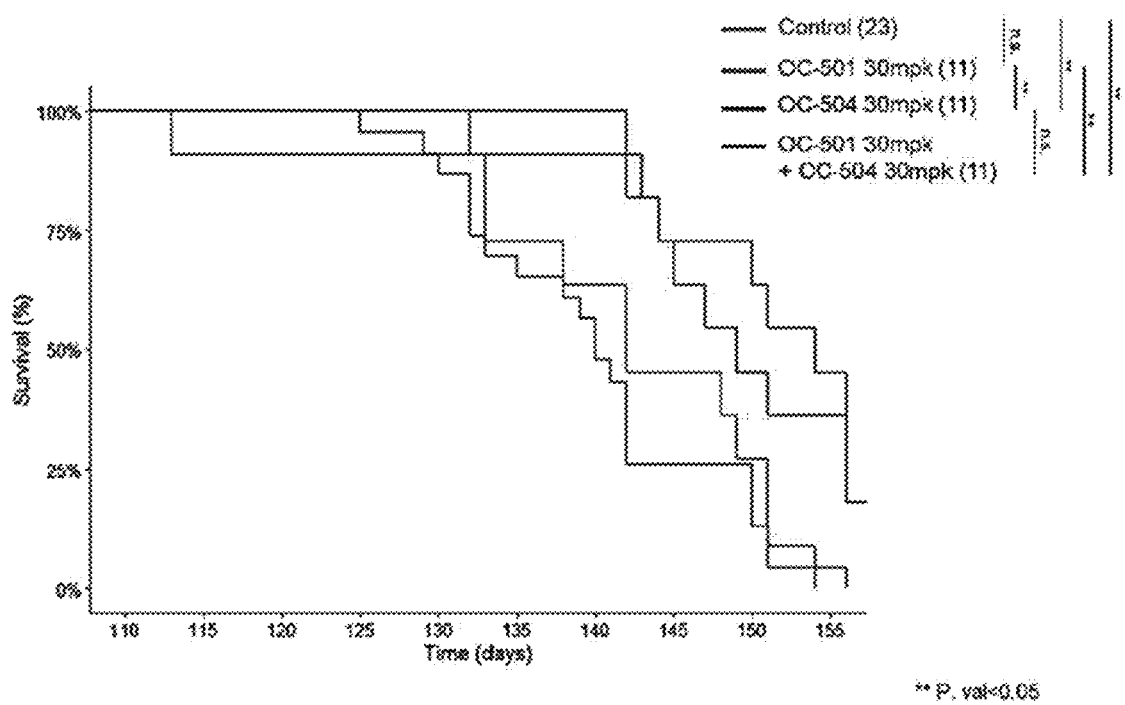
FIG. 1 is a diagram showing the overall median duration of life of Lou Gehrig animal model mice:
Control: PBS administered group;
OC-501: Dimenhydrinate administered group;
OC-504: Calcium pantothenate administered group; and
OC-501+OC-504: Dimenhydrinate and calcium pantothenate combined administered group.

Hereinafter, an embodiment of the present invention will be described in detail with reference to the accompanying drawings. However, the following embodiments are presented as examples for the present invention, and when it is determined that a detailed description of well-known technologies or configurations known to those skilled in the art may unnecessarily obscure the gist of the present invention, the detailed description thereof may be omitted, and the present invention is not limited thereto. Various modifications and applications of the present invention are possible within the description of claims to be described below and the equivalent scope interpreted therefrom.

Terminologies used herein are terminologies used to properly express preferred embodiments of the present invention, which may vary according to a user, an operator's intention, or customs in the art to which the present invention pertains. Accordingly, definitions of the terminologies need to be described based on contents throughout this specification. Throughout the specification, unless explicitly described to the contrary, when a certain part "comprises" a certain component, it will be understood to imply the inclusion of stated elements but not the exclusion of any other elements.

All technical terms used in the present invention, unless otherwise defined, have the meaning as commonly understood by those skilled in the related art of the present invention. In addition, although preferred methods and samples are described herein, similar or equivalent methods and samples thereto are also included in the scope of the present invention. The contents of all publications disclosed as references in this specification are incorporated in the present invention.

In an aspect, the present invention provides a pharmaceutical composition for prevention or treatment of myopathy, including pantothenic acid or a pharmaceutically acceptable salt thereof as an active ingredient.

In an embodiment, the myopathy may be amyotrophic lateral sclerosis (ALS), Duchenne muscular dystrophy, or myotonic dystrophy.

In an embodiment, the pharmaceutically acceptable salt of pantothenic acid may be calcium pantothenate, which is a calcium salt of a dextrorotatory isomer of pantothenic acid, and the calcium pantothenate may be a compound having Molecular Formula of $C_{18}H_{32}CaN_{20}O_{10}$ represented by Chemical Formula 1 below and a molecular weight of 476.536 g/mol:

[Chemical Formula 1]

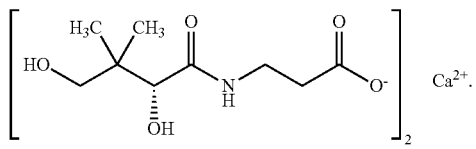

In an embodiment, the composition of the present invention may further include diphenhydramine or a pharmaceutically acceptable salt thereof. The pharmaceutically acceptable salt of diphenhydramine may be dimenhydrinate, which is a salt of diphenhydramine and 8-chlorotheophylline, and the dimenhydrinate may be a compound having Molecular Formula of $C_{24}H_{28}ClN_5O_3$ represented by Chemical Formula 2 below and a molecular weight of 469.97 g/mol:

[Chemical Formula 2]

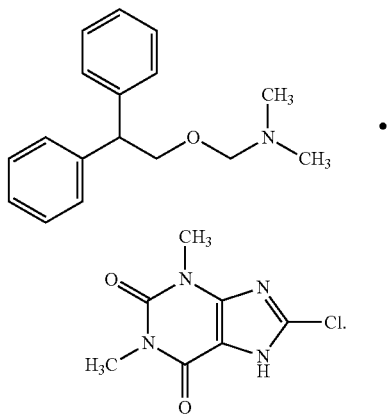

In an embodiment, the composition of the present invention may contain calcium pantothenate, or calcium pantothenate and dimenhydrinate as active ingredients, and may also include pharmaceutically acceptable salts thereof, and all possible solvates, hydrates, racemates, or stereoisomers that may be prepared therefrom.

In an embodiment, an acid addition salt formed with a pharmaceutically acceptable free acid is useful as the pharmaceutically acceptable salt thereof. The acid addition salts are obtained from inorganic acids such as hydrochloric acid, nitric acid, phosphoric acid, sulfuric acid, hydrobromic acid, hydroiodic acid, nitrous acid, or phosphorous acid, and non-toxic organic acids such as aliphatic mono- and di-carboxylates, phenyl-substituted alkanoates, hydroxy alkanoates and alkanedioates, aromatic acids, aliphatic and aromatic sulfonic acids. These pharmaceutically non-toxic salts include sulfate, pyrosulfate, bisulfate, sulfite, bisulfite, nitrate, phosphate, monohydrogen phosphate, dihydrogen phosphate, metaphosphate, pyrophosphate chloride, bromide, iodide, fluoride, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexane-1,6-dioate, benzoate, chlorobenzoate, methylbenzoate, dinitrobenzoate, hydroxybenzoate, methoxybenzoate, phthalate, terephthalate, benzenesulfonate, toluenesulfonate, chlorobenzenesulfonate, xylenesulfonate, phenylacetate, phenylpropionate, phenylbutyrate, citrate, lactate, hydroxybutyrate, glycolate, malate, tartrate, methanesulfonate, propanesulfonate, naphthalene-1-sulfonate, naphthalene-2-sulfonate, or mandelate.

The acid addition salts according to the present invention may be prepared by a conventional method, for example, by dissolving pantothenic acid in an excess aqueous acid solution and precipitating the salt in a water-miscible organic solvent such as methanol, ethanol, acetone, or acetonitrile. In addition, the acid addition salts may also be prepared by evaporating and drying a solvent or excess acid from the mixture or by suction-filtering the precipitated salt.

In addition, pharmaceutically acceptable metal salts may be prepared using bases. An alkali metal salt or an alkaline earth metal salt may be obtained, for example, by dissolving the compound in an excess alkali metal hydroxide or alkaline earth metal hydroxide solution, filtering a non-dissolved compound salt, and then evaporating and drying a filtrate. At this time, as the metal salt, it is pharmaceutically suitable to prepare a sodium, potassium, or calcium salt. Further, silver salts corresponding thereto may be obtained by reacting the alkali metal or alkaline earth metal salt with a suitable silver salt (e.g., silver nitrate).

In an embodiment, the pantothenic acid or the pharmaceutically acceptable salt thereof may be included at 250 nM to 5 μM, respectively, the calcium pantothenate may be included at 250 nM to 5 μM, and the calcium pantothenate and the dimenhydrinate may be included at 250 nM to 5 μM, respectively.

In an embodiment, the composition may include both calcium pantothenate and dimenhydrinate, and the calcium pantothenate and the dimenhydrinate may be administered to amyotrophic lateral sclerosis patients sequentially or simultaneously.

In an embodiment, the composition may prolong the duration of life of the amyotrophic lateral sclerosis patients.

In an embodiment, the composition may promote myoblast differentiation and myogenesis.

In an embodiment, the composition may increase the expression of MHC, myogenin 4-EBP, and p70S6K.

In an embodiment, the amyotrophic lateral sclerosis may be familial amyotrophic lateral sclerosis (familial ALS) caused by Cu/Zn Superoxide Dismutase 1 gene (SOD1) mutation.

In the present invention, the term "myopathy" may be muscular dystrophy, muscular atrophy, myositis, polymyositis, peripheral vascular disease, sarcopenia, or fibrosis. The muscular atrophy may be amyotrophic lateral sclerosis, and the muscular dystrophy may be, for example, Becker's muscular dystrophy, congenital muscular dystrophy, Duchenne muscular dystrophy, distal muscular dystrophy, Emery-Dreifuss muscular dystrophy, facioscapulohumeral muscular dystrophy, limb girdle muscular dystrophy, myotonic muscular dystrophy, oculopharyngeal muscular dystrophy, myotonic muscular dystrophy, sarcoidosis, spinal muscular atrophy, inflammatory myopathy, immune necrotizing myopathy, or Brown-Vialetto-Van Laere syndrome (BVVL).

In the present invention, the term "prevention" refers to all actions that inhibit or delay the occurrence, spread, and recurrence of myopathy by administration of the pharmaceutical composition according to the present invention. The "treatment" refers to all actions that improve or beneficially change the symptoms of myopathy by administering the composition of the present invention. Those of ordinary skill in the art to which the present invention pertains will be able to determine the degree of improvement, enhancement, and treatment by knowing the exact criteria of a disease for which the composition of the present invention is effective by referring to data presented by the Korean Academy of Medical Sciences, etc.

In the present invention, the term "therapeutically effective dose" used in combination with the active ingredients means an amount effective to prevent or treat myopathy, and the therapeutically effective dose of the composition of the present invention may vary depending on several factors, such as a method of administration, a target site, the condition of a patient. Accordingly, when used in the human body, the dose should be determined as an appropriate amount in consideration of both safety and efficiency. It is also possible to estimate the amount used in humans from the effective dose determined through animal experiments. These matters to be considered when determining the effective dose are described in, for example, Hardman and Limbird, eds., Goodman and Gilman's The Pharmacological Basis of Therapeutics, 10th ed. (2001), Pergamon Press; and E. W. Martin ed., Remington's Pharmaceutical Sciences, 18th ed. (1990), Mack Publishing Co.

The pharmaceutical composition of the present invention is administered in a pharmaceutically effective dose. The 'pharmaceutically effective dose' used herein refers to an amount enough to treat the disease at a reasonable benefit/risk ratio applicable to medical treatment and not to cause side effects. An effective dose level may be determined according to factors including the health condition of a patient, the cause and severity of myopathy, the activity of a drug, the sensitivity to the drug, a method of administration, a time of administration, a route of administration, a release rate, duration of treatment, and combined or simultaneously used drugs, and other factors well-known in the medical field. The composition of the present invention may be administered as an individual therapeutic agent or in combination with other therapeutic agents, and may be administered sequentially or simultaneously with existing therapeutic agents, and may be administered singly or multiply. It is important to administer an amount capable of obtaining a maximum effect with a minimal amount without side effects by considering all the factors, which may be easily determined by those skilled in the art.

The pharmaceutical composition of the present invention may include carriers, diluents, excipients, or a combination of two or more thereof, which are commonly used in biological agents. As used herein, the term "pharmaceutically acceptable" refers to exhibiting non-toxic properties to cells or humans exposed to the composition. The carrier is not particularly limited as long as the carrier is suitable for in vivo delivery of the composition, and may be used by combining, for example, compounds described in Merck Index, 13th ed., Merck & Co. Inc., saline, sterile water, a Ringer's solution, buffered saline, a dextrose solution, a maltodextrin solution, glycerol, ethanol, and one or more of these components, and if necessary, other conventional additives such as an antioxidant, a buffer, and a bacteriostat may be added. In addition, the pharmaceutical composition may be prepared in injectable formulations such as an aqueous solution, a suspension, and an emulsion, pills, capsules, granules, or tablets by further adding a diluent, a dispersant, a surfactant, a binder, and a lubricant. Furthermore, the pharmaceutical composition may be prepared preferably according to each disease or ingredients using a suitable method in the art or a method disclosed in Remington's Pharmaceutical Science (Mack Publishing Company, Easton PA, 18th, 1990).

In an embodiment, the pharmaceutical composition may be one or more formulations selected from the group consisting of oral formulations, external preparations, suppositories, sterile injection solutions, and sprays, and more preferably oral or injection formulations.

As used herein, the term "administration" means providing a predetermined substance to a subject or patient by any suitable method, and the pharmaceutical composition may be administered parenterally (e.g., intravenously, subcutaneously, intraperitoneally, or topically as an injectable formulation) or orally according to a desired method, and the dose range may vary depending on the body weight, age, sex, and health condition of a patient, a diet, an administration time, an administration method, an excretion rate, and the severity of a disease. Liquid formulations for oral administration of the composition of the present invention correspond to suspensions, internal solutions, emulsions, syrups, etc., and may include various excipients, such as wetting agents, sweeteners, fragrances, and preservatives, in addition to water and liquid paraffin, which are commonly used simple diluents. Formulations for parenteral administration include sterilized aqueous solutions, non-aqueous solvents, suspensions, emulsions, lyophilized agents, suppositories, and the like. The pharmaceutical composition of the present invention may also be administered by any device capable of transferring an active substance to a target cell. Preferred methods of administration and formulations are intravenous injections, subcutaneous injections, intradermal injections, intramuscular injections, drop injections, or the like. The injections may be prepared by using aqueous solvents such as a physiological saline solution and a Ringer's solution, and non-aqueous solvents such as vegetable oils, higher fatty acid esters (e.g., ethyl oleate), and alcohols (e.g., ethanol, benzyl alcohol, propylene glycol, glycerin, etc.). The injections may include pharmaceutical carriers, such as a stabilizer (e.g., ascorbic acid, sodium hydrogen sulfite, sodium pyrosulfite, BHA, tocopherol, EDTA, etc.) for the prevention of degeneration, an emulsifier, a buffer for pH control, and a preservative to inhibit microbial growth (e.g., phenyl mercury nitrate, thimerosal, benzalkonium chloride, phenol, cresol, benzyl alcohol, etc.).

As used herein, the term "subject" refers to any animal, including monkeys, cows, horses, sheep, pigs, chickens, turkeys, quails, cats, dogs, mice, rats, rabbits, or guinea pigs in addition humans, who have or may develop amyotrophic lateral sclerosis. It is possible to prevent or treat these diseases by administering the pharmaceutical composition of the present invention to the subject. The pharmaceutical composition of the present invention may be administered in combination with existing therapeutic agents.

The pharmaceutical composition of the present invention may further include pharmaceutically acceptable additives.

At this time, the pharmaceutically acceptable additives may use starch, gelatinized starch, microcrystalline cellulose, lactose, povidone, colloidal silicon dioxide, calcium hydrogen phosphate, lactose, mannitol, syrup, gum arabic, pregelatinized starch, corn starch, powdered cellulose, hydroxypropyl cellulose, Opadry, sodium starch glycolate, lead carnauba, synthetic aluminum silicate, stearic acid, magnesium stearate, aluminum stearate, calcium stearate, white sugar, dextrose, sorbitol, talc, and the like. The pharmaceutically acceptable additives according to the present invention are preferably included in an amount of 0.1 to 90 parts by weight based on the composition, but are not limited thereto.

In an aspect, the present invention provides a food composition for prevention or improvement of myopathy, including pantothenic acid or a pharmaceutically acceptable salt thereof as an active ingredient.

In an embodiment, the myopathy may be amyotrophic lateral sclerosis (ALS), Duchenne muscular dystrophy, or myotonic dystrophy.

In an embodiment, the pharmaceutically acceptable salt of pantothenic acid may be calcium pantothenate, which is a calcium salt of a dextrorotatory isomer of pantothenic acid, and the calcium pantothenate may be a compound having Molecular Formula of $C_{18}H_{32}CaN_2O_{10}$ represented by Chemical Formula 1 below and a molecular weight of 476.536 g/mol:

[Chemical Formula 1]

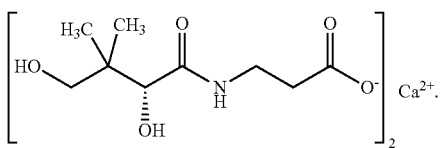

In an embodiment, the composition of the present invention may further include diphenhydramine or a pharmaceutically acceptable salt thereof. The pharmaceutically acceptable salt of diphenhydramine may be dimenhydrinate, which is a salt of diphenhydramine and 8-chlorotheophylline, and the dimenhydrinate may be a compound having Molecular Formula of $C_{24}H_{28}ClN_5O_3$ represented by Chemical Formula 2 below and a molecular weight of 469.97 g/mol:

[Chemical Formula 2]

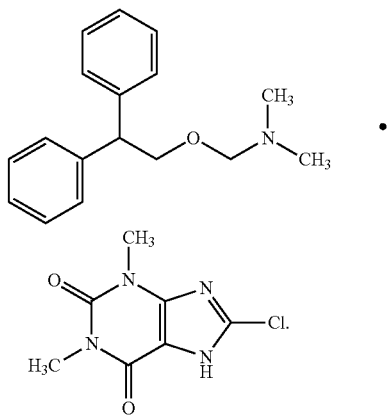

In an embodiment, the composition of the present invention may contain calcium pantothenate, or calcium pantothenate and dimenhydrinate as active ingredients, and may also include pharmaceutically acceptable salts thereof, and all possible solvates, hydrates, racemates, or stereoisomers that may be prepared therefrom.

In an embodiment, the pantothenic acid or the pharmaceutically acceptable salt thereof may be included at 250 nM to 5 μM, respectively, the calcium pantothenate may be included at 250 nM to 5 μM, and the calcium pantothenate and the dimenhydrinate may be included at 250 nM to 5 μM, respectively.

In an embodiment, the composition may include both calcium pantothenate and dimenhydrinate.

In an embodiment, the amyotrophic lateral sclerosis may be familial amyotrophic lateral sclerosis (familial ALS) caused by Cu/Zn Superoxide Dismutase 1 gene (SOD1) mutation.

When the composition of the present invention is used as the food composition, the pantothenic acid, diphenhydramine, calcium pantothenate, or calcium pantothenate and dimenhydrinate may be added as they are or used together with other foods or food ingredients, and may be used appropriately according to conventional methods. The composition may include food acceptable supplement additives in addition to the active ingredients, and the mixing amount of the active ingredients may be appropriately determined depending on the purpose of use (prevention, health, or therapeutic treatment).

The term "food supplement additive" used herein means a component that may be supplementarily added to food, and may be appropriately selected and used by those skilled in the art as being added to prepare a health functional food of each formulation. Examples of the food supplement additives include various nutrients, vitamins, minerals (electrolytes), flavors such as synthetic and natural flavors, colorants and fillers, pectic acid and salts thereof, alginic acid and salts thereof, organic acids, protective colloidal thickeners, pH adjusters, stabilizers, preservatives, glycerin, alcohols, carbonation agents used in carbonated drinks, and the like, but the types of food supplement additives of the present invention are not limited by the above examples.

The food composition of the present invention may include a health functional food. The term "health functional food" used herein refers to food prepared and processed in the form of tablets, capsules, powders, granules, liquids, pills, and the like by using raw materials or ingredients having functionalities useful to the human body. Here, the 'functionality' refers to regulating nutrients to the structure and function of the human body or to obtaining effects useful for health applications such as physiological action. The health functional food of the present invention can be prepared by methods to be commonly used in the art and may be prepared by adding raw materials and ingredients which are commonly added in the art in preparation. In addition, the formulations of the health functional food may also be prepared without limitation as long as the formulation is recognized as a health functional food. The food composition of the present invention may be prepared in various types of formulations, and unlike general drugs, the food composition has an advantage that there is no side effect that may occur when taking a long-term use of the drug by using the food as a raw material, and has excellent portability, so that the health functional food of the present invention can be taken as supplements to enhance the effects of anticancer agents.

In addition, there is no limitation in a type of health functional food in which the composition of the present invention may be used. In addition, the composition including pantothenic acid or the salt thereof, or calcium pantothenate and dimenhydrinate of the present invention as active ingredients may be prepared by mixing other auxiliary ingredients and known additives that may be contained in the health functional foods according to the selection of those skilled in the art. Examples of foods to be added include meat, sausage, bread, chocolate, candy, snacks, confectionery, pizza, ramen, other noodles, gum, dairy products including ice cream, various soups, beverages, tea, drinks, alcoholic beverages, vitamin complexes, and the like, and may be prepared to be added to extract, tea, jelly, juice, and the like prepared by using the extract according to the present invention as a main ingredient.

In an aspect, the present invention relates to a method for treating myopathy, including administering pantothenic acid, diphenhydramine, or a pharmaceutically acceptable salt thereof to a subject suffering from myopathy.

In an aspect, the present invention relates to a use of pantothenic acid, diphenhydramine, or a pharmaceutically acceptable salt thereof for use in the preparation of a pharmaceutical composition for prevention or treatment of myopathy.

Modes of the Invention

Hereinafter, the present invention will be described in more detail with reference to the following Examples. However, the following Examples are only intended to embody the contents of the present invention, and the present invention is not limited thereto.

Example 1. Confirmation of Lou Gehrig Treatment Effect 1-1. Confirmation of Effect on ALS Animal Model SOD1 G93A mice (B6SJL-Tg (SOD1*G93A) 1Gur/J (Jackson Lab; stock no. 002726)), as only a Lou Gehrig mouse model showing both clinical and histopathological characteristics in patients with familial and sporadic Lou Gehrig's diseases were divided into total four groups of a drug non-administered group (PBS administration, n=23), a dimenhydrinate (OC-501) administered group (30 mpk, n=11), a calcium pantothenate (OC-504) administered group (30 mpk, n=11), and a combined administered group (OC-501+OC-504) (each 30 mpk, n=11), and the drugs were administered intraperitoneally from the time the mice were 10 weeks old. The presence of symptoms and mortality were confirmed through a daily behavioral test set.

Figure 2:
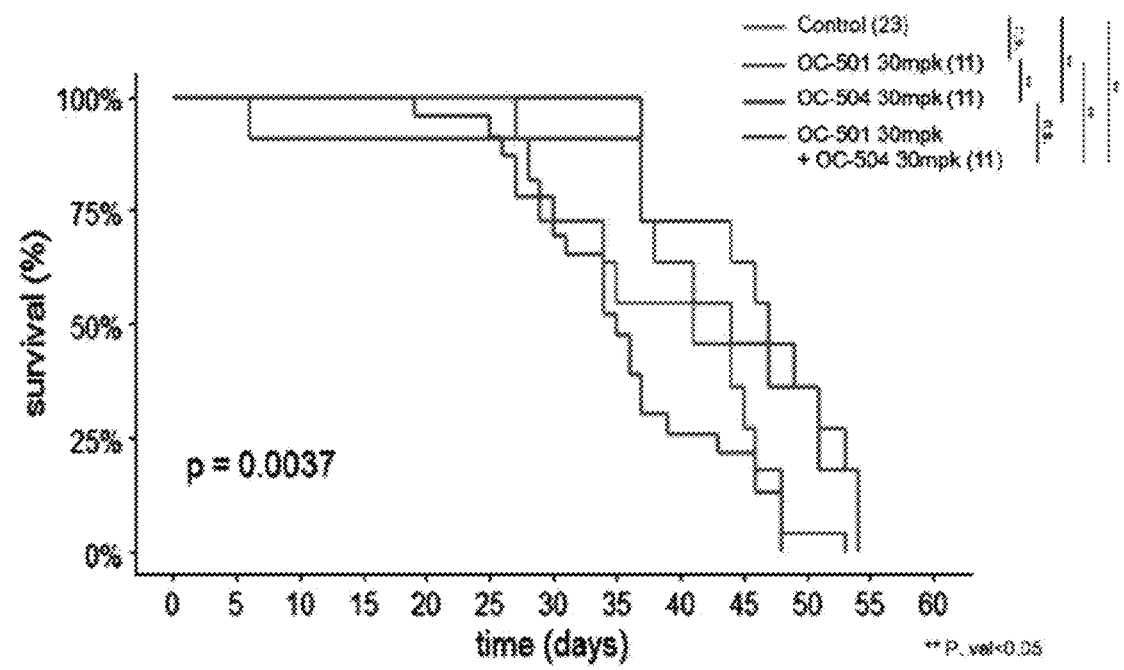
FIG. 2 is a diagram showing the median duration of life after the appearance of Lou Gehrig symptoms in Lou Gehrig animal model mice:
Control: PBS administered group;
OC-501: Dimenhydrinate administered group;
OC-504: Calcium pantothenate administered group; and
OC-501+OC-504: Dimenhydrinate and calcium pantothenate combined administered group.

As a result, it was found that in the calcium pantothenate (OC-504) administered group and the combined administered group (OC-501 & 504), the total median duration of life was increased statistically significantly compared to the drug non-administered group (FIG. 1). In particular, in the drug non-administered group, the median duration of life after the appearance of Lou Gehrig's symptoms was about 5 weeks, but in the calcium pantothenate (OC-504) administered group, the duration of life of about 2 weeks was prolonged, and in the combined administered group (OC-501 & 504), the duration of life of about 10 days was prolonged (FIG. 2). When the median duration of life after the appearance of Lou Gehrig's symptoms in Lou Gehrig's patients was about 2 years (5 weeks of the median duration of life in the drug non-administered group), it can be seen that the life of about 2 weeks observed in the calcium pantothenate (OC-504) administered group was prolonged from the duration of life of about 9.6 months.

1-2. Confirmation of Effect of Promoting Myoblast Differentiation and Myogenesis Mouse-derived C2C12 cells (KCTC, Biological Resources Center) were dispensed into a 12-well plate and incubated in a Dulbecco's modified Eagle's medium (DMEM) containing 1% penicillin/streptomycin and 10% fetal bovine serum (FBS) under conditions of 5% $CO_2$ and 37° C. When the cells reached 70 to 80% density, the cells were treated with a differentiation medium (DMEM medium containing 2% horse serum (H/S)) and DMSO (control group), dimenhydrinate (OC-501) 5 µM or 10 µM, calcium pantothenate (OC-504) 10 µM, or dimenhydrinate+calcium pantothenate (5 µM+10 µM or 10 µM+10 µM). At this time, 500 µM of $H_2O_2$ (hydrogen peroxide) was treated with the differentiation medium to create conditions for inhibiting differentiation. Thereafter, the differentiation medium containing $H_2O_2$ and the drugs were exchanged every 2 days. After 4 to 6 days, when the shape of myotubes was confirmed, the myotubes were added with 80 µl of a lysis buffer and then vortexed, and centrifuged for 10 minutes at 14000 rpm, and the obtained proteins were added with a 5× sample buffer and reacted in 95° C. boiling water for 5 minutes. 8 µg of the reacted proteins was loaded on 8% and 12% SDS-PAGE gels, developed, and then transferred to a membrane. The membrane was blocked with PBST containing 5% skim milk at room temperature for 1 hour. The membrane was washed with 1×PBST, added with a primary antibody diluted at 1:1000, and then O/N reacted at 4° C. The next day, the membrane was washed with 1×PBST three times every 10 minutes, added with a secondary antibody diluted at 1:5000 in PBST containing 5% skim milk, and then reacted at room temperature for 1 hour. The membrane was washed with 1×PBST three times every 10 minutes, reacted in an enhanced chemiluminescent solution (ECL), and then exposed to an X-ray film to obtain a Western blot analysis result.

Figure 3:
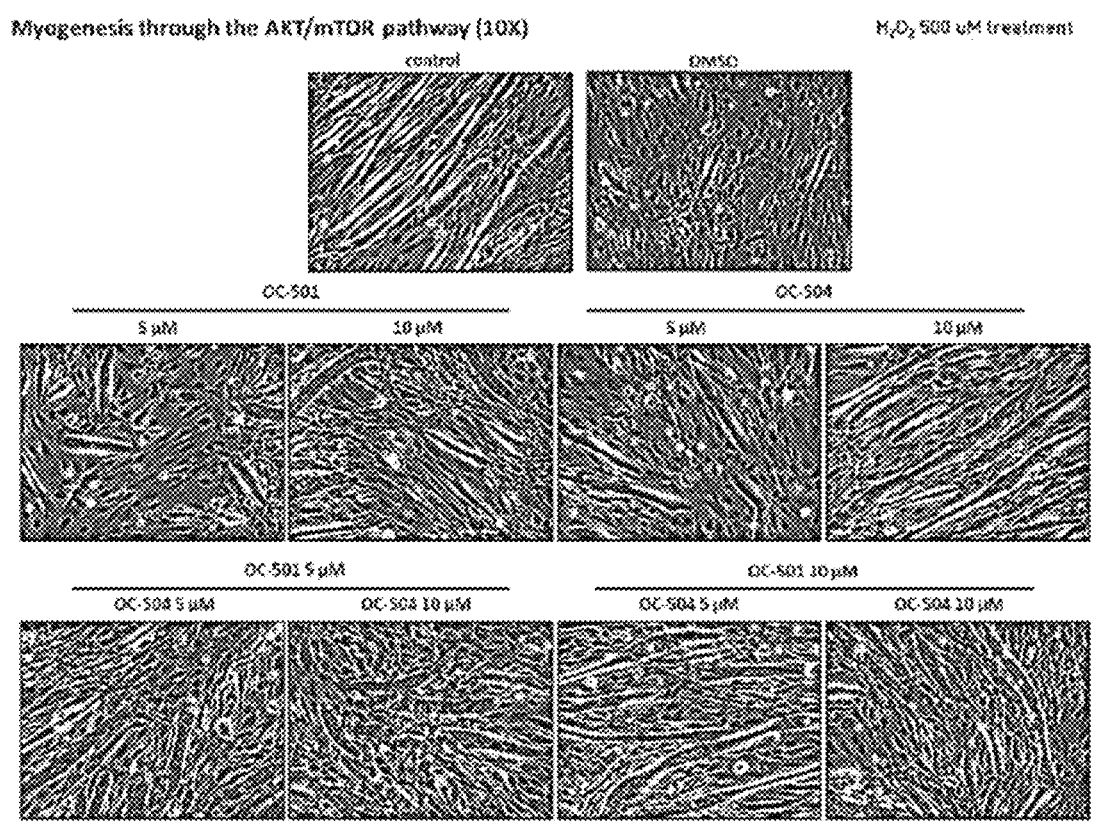
FIG. 3 is a diagram of confirming myoblast differentiation of muscular cell lines through a microscope by drug treatment under a condition for suppressing myoblast differentiation (Myogenesis):
Control: PBS administered group;
DMSO: Control group
OC-501: Dimenhydrinate; and
OC-504: Calcium pantothenate.
Figure 4:
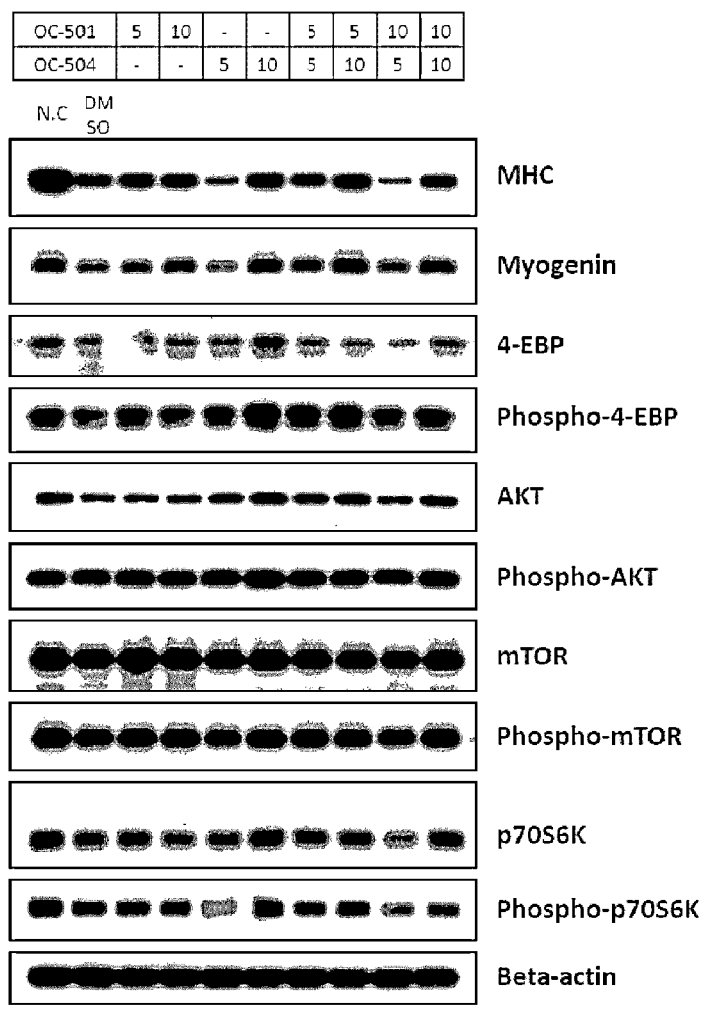
FIG. 4 is a diagram of confirming the expression of proteins of an AKT/mTOR pathway associated with myogenesis by Western blot analysis.
Figure 5:
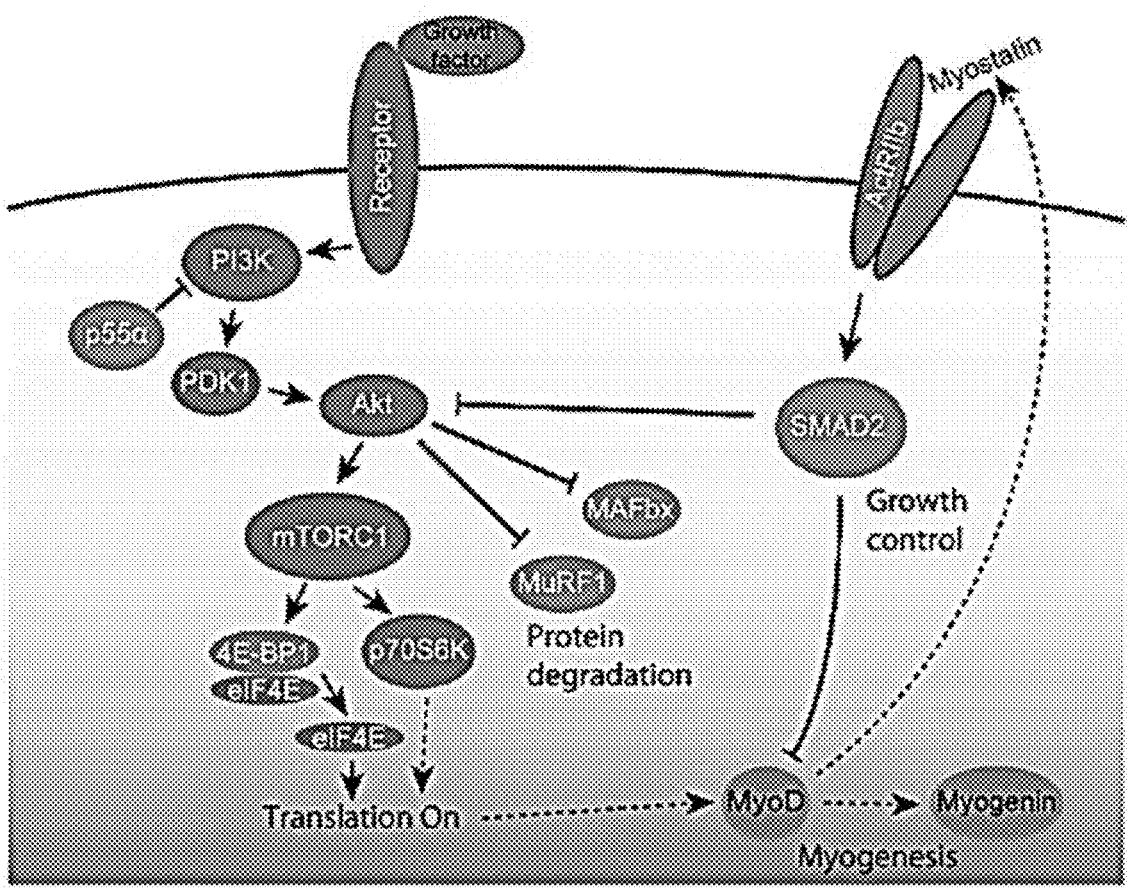
FIG. 5 is a schematic diagram showing an AKT/mTOR pathway associated with myogenesis.

As a result of observing the cells, it was shown that myoblast differentiation was significantly increased in an OC-504 10 µM administered group, and it was shown that myoblast differentiation was significantly increased in a OC-501 5 µM and OC-504 5 µM combined administered group, a OC-501 5 µM and OC-504 10 µM combined administered group, a OC-501 10 µM and OC-504 5 µM combined administered group, and a OC-501 10 µM and OC-504 10 µM combined administered group (FIG. 3). In addition, as a result of confirming MHC and myogenin, as myoblast differentiation markers in cells, it was shown that in a DMSO group administered with only 500 µM of $H_2O_2$, the MHC and myogenin were decreased, but it was shown that in an OC-501 5 µM administered group, an OC-501 10 µM administered group, an OC-504 10 µM administered group, an OC-501 5 µM+OC-504 10 µM combined administered group, and an OC-501 10 µM+OC-504 10 µM combined administered group, the expression levels of MHC and myogenin were increased (FIG. 4). In addition, as a result of confirming the expression of 4-EBP and p70S6K, as sub-signals of an AKT/mTOR pathway associated with myogenesis, it was shown that in the OC-504 10 µM administered group and the OC-501 10 µM+OC-504 10 µM combined administered group, the expression of 4-EBP was increased compared to the control group (DMSO), and it was shown that even in the case of P70S6K, similarly, the expression of P70S6K was increased in the OC-504 10 µM administered group and the OC-501 10 µM+OC-504 10 µM combined administered group (FIG. 4). Through this, when the dimenhydrinate and calcium pantothenate were treated alone or in combination, the myoblast differentiation was promoted and the myogenesis was improved, and as a result, it was confirmed that the duration of life against Lou Gehrig's disease was prolonged.

Example 2. Confirmation of Treatment Effect of Duchenne Muscular Dystrophy

In MDX mice (Jackso lab, stock no. 001801) (including point mutations in a DMD gene), as the most popular experimental model for testing Duchenne muscular dystrophy, older MDX mice over 40 weeks of age that maintained a homogenous transgenic state through mating and breeding and wild-type mice (normal mice) were anesthetized with isoflurane and then both tibialis anterior (TA) muscles were punctured 30 times each with a 26 G syringe (Korea Vaccine, Cat no. 27-00024-01) to induce physical muscle destruction. On day 3 after inducing muscle destruction, the mice were sacrificed and the TA muscles were separated, washed with 1×PBS (137 mM NaCl, 2.7 mM KCl, 10 mM $Na_2HPO_4$, 20 mM $KH_2PO_4$) twice, and then chopped for 5 minutes with a razor blade, added in serum-free DMEM (GE healthcare, Cat no. SH30243.01) diluted with collagenase II (ThermoFisher, Cat no. 17101015) to a concentration of 2 mg/ml and digested for 1 hour. Thereafter, a supernatant was removed by centrifugation at 300×g for 5 minutes, washed once with serum-free DMEM, and passed through a 70 μm strainer. A pellet obtained by centrifuging the filtered solution at 300×g for 5 minutes was suspended in DMEM containing 10% FBS (ThermoFisher, Cat no. 16000-044) and 1× penicillin/streptomycin (GE healthcare, Cat no. SV30010) to isolate muscle satellite cells (MSCs). The MSCs obtained through 2 to 3 times sub-culturing were treated with PBS (CON), dimenhydrinate (OC-501) (100 μM), calcium pantothenate (OC-504) (100 μM), and dimenhydrinate and calcium pantothenate (OC-501+OC-504) (each 100 μM), and then cell proliferation and growth were observed after 48 hours. In the experiment, the average and each standard deviation of measurement results of three or more times were obtained, and significance with the control was determined through T testing (*: p-val.<0.05, : p-val.<0.01, *: p-val.<0.001).

Figure 6:
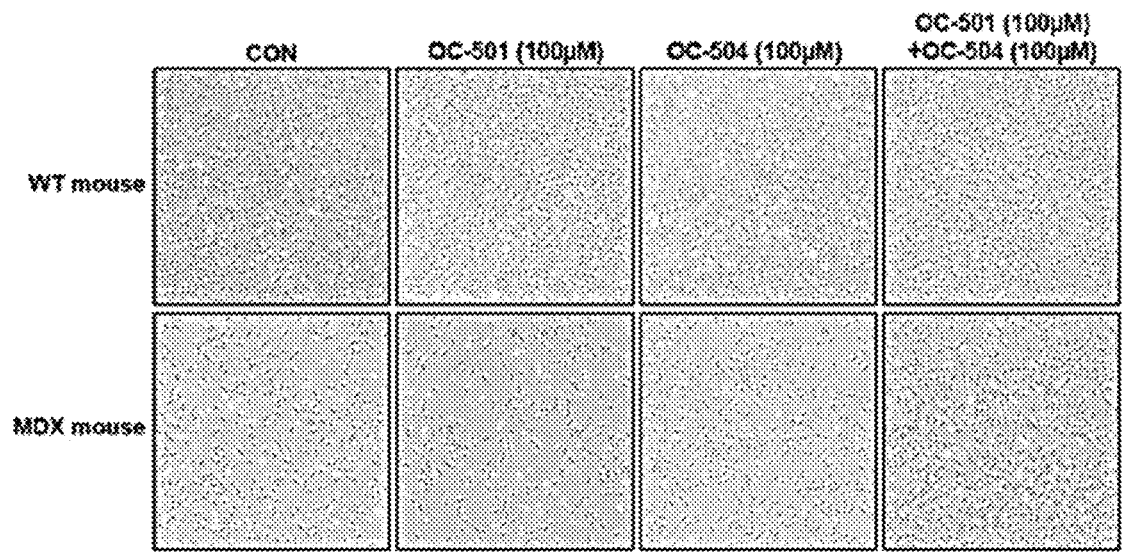
FIG. 6 is a diagram of confirming a cell growth promoting effect of muscle satellite cells (MSCs).
Figure 6:
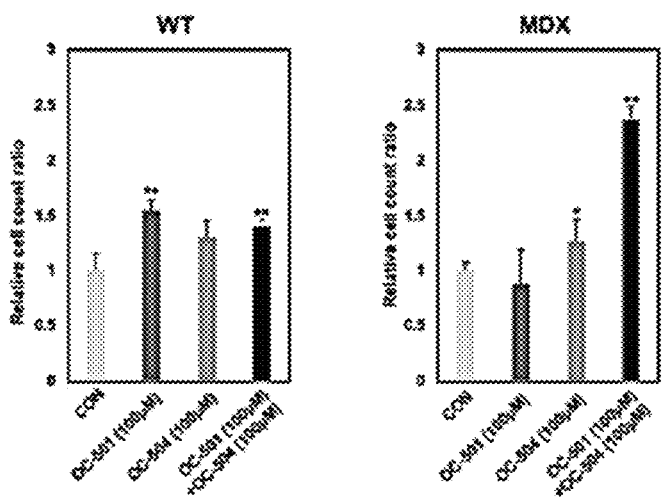

As a result, OC-501 significantly promoted the proliferation of MSCs derived from wild-type mice (OC-501: 1.55, Combi: 1.40), and OC-504 significantly promoted the proliferation of MSCs derived from MDX mice. In particular, when OC-501 and OC-504 were co-treated, the growth of MSCs derived from MDX mice was significantly increased compared to that of MSCs derived from wild-type mice (FIG. 6). Through this, it was confirmed that both OC-504 alone and OC-501+504 combined administration had a muscle increasing effect in Duchenne muscular dystrophy.

The invention claimed is:

1. A method for preventing or treating amyotrophic lateral sclerosis or Duchenne muscular dystrophy, comprising administering a composition comprising pantothenic acid or a pharmaceutically acceptable salt thereof to a subject in need thereof.

2. The method of claim 1, wherein the pharmaceutically acceptable salt of the pantothenic acid is calcium pantothenate.

3. The method of claim 1, wherein the calcium pantothenate is represented by Chemical Formula 1 below:

[Chemical Formula 1]

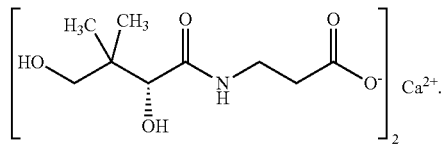

4. The method of claim 1, wherein the composition further comprises dimenhydrinate or a pharmaceutically acceptable salt thereof.

5. The method of claim 4, wherein the dimenhydrinate is represented by Chemical Formula 2 below:

[Chemical Formula 2]

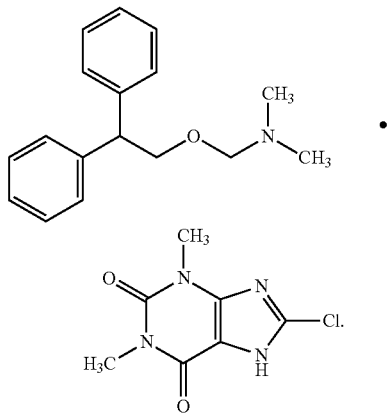

6. The method of claim 1, wherein duration of life of patients with amyotrophic lateral sclerosis or Duchenne muscular dystrophy is prolonged.

7. The method of claim 1, wherein myoblast differentiation and myogenesis are promoted.

8. A method for prolonging a duration of life of a subject with amyotrophic lateral sclerosis or Duchenne muscular dystrophy, comprising administering a composition comprising pantothenic acid or a pharmaceutically acceptable salt thereof to the subject.

9. The method of claim 8, wherein the composition further comprises dimenhydrinate or a pharmaceutically acceptable salt thereof.

10. A method for promoting myoblast differentiation and myogenesis of a subject with amyotrophic lateral sclerosis or Duchenne muscular dystrophy, the method comprising administering a composition comprising pantothenic acid or a pharmaceutically acceptable salt thereof to the subject.

11. The method of claim 10, wherein the composition further comprises dimenhydrinate or a pharmaceutically acceptable salt thereof.

* * * * *